United States Patent [19]

Pelloski

[11] Patent Number: 4,544,581

[45] Date of Patent: Oct. 1, 1985

[54] BLACK CORROSION RESISTANT COATING AND METHOD FOR A METAL SUBSTRATE

[75] Inventor: Peter E. Pelloski, Ferndale, Mich.

[73] Assignee: Depor Industries, Troy, Mich.

[21] Appl. No.: 654,751

[22] Filed: Sep. 25, 1984

[51] Int. Cl.⁴ .......................... B05D 3/02; B05B 7/00; C09D 5/10

[52] U.S. Cl. ................. 427/383.7; 106/1.17; 106/1.12; 106/1.29; 106/14.39; 427/406; 524/783; 524/786; 524/780; 524/857

[58] Field of Search .................. 106/1.17, 1.12, 1.29, 106/14.39; 427/383.7, 406; 524/783, 786, 780, 857

[56] References Cited

U.S. PATENT DOCUMENTS

| | | | |
|---|---|---|---|
| 3,796,582 | 3/1974 | Leahey | 106/1.17 |
| 4,156,613 | 5/1979 | Hund | 106/14.39 |
| 4,391,855 | 7/1983 | Geek | 427/383.7 |
| 4,417,007 | 11/1983 | Salensky | 106/1.17 |

*Primary Examiner*—Sam Silverberg
*Attorney, Agent, or Firm*—Barnes, Kisselle, Raisch, Choate, Whittemore & Hulbert

[57] ABSTRACT

A black corrosion resistant coating composition which is applied to a metal substrate as a wet film and heated to dry and initiate curing to provide a protective coating tenaciously bonded to the substrate. The composition has a corrosion inhibiting powdered metal, a black pigment of manganese dioxide and a primary bonding titanate polymer which when heated, undergoes a hydrolysis reaction producing an inorganic titanium dioxide bonding of the coating to the substrate. Improved film integrity and adhesion of the wet coating prior to the hydrolysis reaction is provided by a secondary organic resin. Preferably the coating composition also has thixotropic, metal suspension and hygroscopic agents. All the constituents are dispersed in a vehicle of active and inactive solvents.

20 Claims, No Drawings

BLACK CORROSION RESISTANT COATING AND METHOD FOR A METAL SUBSTRATE

FIELD OF THE INVENTION

This invention relates to coatings for metal substrates and more particularly, to a black corrosion inhibiting coating for a metal substrate.

BACKGROUND OF THE INVENTION

Many processes and coatings have been developed for protecting metal substrates, and particularly plain carbon steel substrates, from both direct and electrochemical corrosion. Previously, metal substrates have been protected in varying degrees by applying organic and metal coatings such as phosphate, paint, plastic resins, zinc, lead, stainless steel, aluminum and the like.

Geeck U.S. Pat. No. 4,391,855 discloses a particularly effective corrosion resistant coating for a metal substrate. This coating has a corrosion inhibiting finely powdered metal dispersed in a phenoxy resin organic bonding material and a vehicle of solvents. In this coating powdered zinc, cadmium, stainless steel and aluminum are all suitable corrosion inhibitors although zinc is preferred for steel substrates.

Corrosion resistant coatings are used in a variety of applications, many of which require specific colorings. While pigments are readily available for most colors, a satisfactory black corrosion resistant coating previously has not been produced. The two pigments often used to produce a black color, carbon black and iron oxide, increase the rate of oxidation and galvanic action of the powdered metal, thereby destroying corrosion resistance, and hence require an overlay of oil to retard this oxidation and galvanic action. In many applications, such as on the underside of automobiles, this oil overlay is quickly washed or worn off which destroys the corrosion resistance of the black coating.

SUMMARY OF THE INVENTION

In the black coating of this invention a pigment of manganese dioxide and a primary corrosion inhibitor of finely divided metal are dispersed in a primary bonding material of a titanate resin and a vehicle of solvents. Preferably, the coating is adhered to a metal substrate by a secondary resin until the primary resin is cured to bond the coating to the substrate. Preferably, in the coating a thin and uniform film is produced on a substrate by including a thixotropic agent, premature curing of the primary bonding material is prevented by a hygroscopic agent, and the finely divided metal is prevented from settling out by a suspension agent.

Objects, features and advantages of this invention are to provide a corrosion resistant coating and method which has a black color, improved corrosion resistance, improved adhesion to a metal substrate, improved abrasion resistance, permits coated substrates to be welded together, can be readily, easily and economically applied in one coat, readily and easily cured at a relatively low elevated temperature in a relatively short period of time, and is rugged, durable, economical and has a low coefficient of friction.

These and other objects, features and advantages of this invention will be apparent from the following detailed description and appended claims.

DETAILED DESCRIPTION OF THE INVENTION

In this invention, a thin layer of a corosion resistant coating in a liquid form is applied to a metal substrate such as by dipping, rolling, brushing, spraying or the like. To convert the liquid layer to a solid dry film and to bond the film to a metal substrate, the liquid layer is heated to an elevated temperature for a relatively short period of time. The heating evaporates solvents in the liquid layer and initiates curing of a primary binding material to provide a dry, thin and uniform protective film or coating permanently adhered to the substrate.

Corrosion Inhibiting Metal

In the composition of the coating, the primary corrosion inhibitor is believed to be a finely divided metal. To provide cathodic protection against galvanic corrosion of the metallic substrate, the finely divided metal is sufficiently anodic or high enough in the galvanic series to act as an anode in a couple with the substrate. For a substrate of iron or steel suitable anodic finely divided metals are magnesium, zinc, aluminum, stainless steel and the like. For most applications finely divided zinc is preferred because when exposed to the atmosphere, such as when the coating is scratched, it forms a self protecting film of fairly impermeable basic corrosion or oxidation products which protect the substrate from further attack. However, where a coating with a low coefficient of friction is desired, such as on bolts and nuts to provide an improved and consistent torque-tension relationship, finely divided aluminum may be used along with or in lieu of zinc.

Preferably, the finely divided metal is a powdered metal having an average particle size of less than 60 microns, desirably less than 40 microns, and perferably less than 20 microns and a maximum individual particle size desirably not more than 100 microns. Preferably, the powdered metal has an average particle size in the range of about 2 to 15 microns with a maximum individual particle size of about 30 to 60 microns. The amount of finely divided metal in the coating can be about 40–65%, desirably 45–60% and preferably 50–60% by weight of the solids in the coating.

Suitable powdered metals are commercially available from various sources. Powdered zinc can be purchased from Purity Zinc Company of Toronto, Canada under the grade designations 510 and 515, and from the Federated Metals Division of American Smelting And Refining Company of 901 Oak Tree Road, South Plainfield, N.J. under the grade designations L-10 and L-15. Powdered magnesium can be purchased from the Federated Metals Division under the grade designations L-10 and L-15. Powdered aluminum can be purchased from the Reynolds Metals Company of Louisville, Ky. under the trade designation 8-232. Although nonleafing grades of aluminum are preferred for most applications, leafing grades may also be used.

Black Pigment

To provide a dark black color, the coating contains manganese dioxide which is believed to be the only pigment which will not significantly impair the corrosion resistance of the coating. Both natural manganese dioxide ($MnO_2$ B) from refined ore and synthetically manufactured manganese dioxide ($MnO_2$ M) are satisfactory. Commercially available synthetic and natural manganese dioxides vary somewhat in concentration, particle size, and contaminants. Synthetic manganese dioxide has a higher concentration of Mn and $MnO_2$ and a larger particle size (97% vs 76% passing through a 325 mesh screen). Synthetic manganese dioxide contains about 2–3% water while natural manganese dioxide has no detectable water. With the same weight of manganese dioxide, the synthetic product produces a darker color coating.

The color of the coating can be made darker or blacker by increasing the concentration of manganese dioxide but this decreases the salt spray corrosion resistance performance as determined by the ASTM test B-117. Thus, usually it is preferable to use only sufficient manganese dioxide to provide a coating having the desired darkness for a particular application so that it will provide greater corrosion resistance. The amount of manganese dioxide in the coating can be 20–45%, desirably 25–40%, and preferably 25–35% by weight of the solids in the coating. This amount of manganese dioxide is equivalent to 30–100%, 40–95%, and 40–80% respectively by weight of the powdered metal.

Natural and synthetic manganese dioxide is commercially available from Chem Metals Corporation of Empire Towers, 7310 Ritchie Highway, Glen Burnie, Md. 21061 under the trade designations B and M respectively. Synthetic manganese dioxide is also available from Kerr McGee Chemical Corporation of Kerr-McGee Center, Oklahoma City, Okla. 73125 under the trade designations AB and SB.

Primary Bonding Material

In the coating the primary bonding material is an organic titanate polymer which is very chemically reactive and polyfunctional. When the coating is heated to a temperature in the range of about 275°–450° F., this titanate polymer produces a purely inorganic titanium dioxide which bonds the coating to the metal substrate. This heating also initiates a hydrolysis reaction which enhances and optimizes the adhesion and abrasion resistance of the dried and cured coating. It is believed the titanium dioxide also improves corrosion resistance by alloying with the zinc or other powdered metal in the coating. Suitable titanate bonding materials are alkyl esters of tetraisopropl titanate, tetrabutyl titanate, 2-ethylhexyl titanate and N-butyl titanate polymer. The amount of titanate polymer in the coating can be about 6–20%, desirably 9–18%, and preferably 12–18% by weight of the solids in the coating. This amount of titanate polymer is equivalent to about 9–47%, 14–42%, and 18–42% respectively by weight of the powdered metal.

These titanate polymers are commercially available from Kay Fries Chemicals Inc. of 360 Lexington Avenue, New York N.Y. and E. I. Du Pont de Nemours & Co. of 1007 Market Street, Wilmington Del.

Secondary Resin

Preferably, to improve film integrity and insure adhesion to a substrate before the primary bonding material is cured, the coating also contains a secondary resin. The amount of secondary resin can be about 0.5–10%, desirably 0.5–7%, and preferably 0.8–3% by weight of dry film solids. This amount of secondary resin is equivalent to about 0.7–23%, 0.7–16%, and 1.2–7% respectively by weight of the powdered metal.

Suitable secondary resins are ethyl-hydroxyl-ethyl cellulose, polyesters, medium WPE resins, silicones, epoxy resin in the presence of caprolactam pyrrolidone and piperidone, conjugated drying oils, unsaturated carboxylic amides and aromatic asphalt resins. These secondary resins are commercially available from Hercules Inc. of 910 Market Street, Wilmington, Del. and Neville Chemical Co. of Neville Island, Pittsburgh, Pa.

Thixotropic Agent

Preferably, to insure that the coating does not gel prior to application to a substrate and that it has suitable flow and wetting characteristics around edges of the substrate, the coating contains a thixotropic agent. A suitable thixotropic agent is silane threated silica dioxide. An appropriate amount of this thixotropic agent is believed to also modestly improve the salt spray corrosion resistance of the coating but an excess amount is believed to produce a porous thin coating having a deleterious effect on corrosion resistance. The amount of this thixotropic agent in the coating may be about 0.4–12% by weight of the powdered metal and preferably about 1–6% by weight of the powdered metal. Silane treated silica dioxide thixotropic agents are commerically available from Tulco Corporation of Faulknes Street, North Billerica, Mass. as Tullanox 292 and 500; Cabot Inc. of Detroit, Mich. as Cabosil M-5; De Gussa Corporation of PO Box 2004, Tetesboro, N.J. as R-972; and Pittsburgh Paint and Chemical Co. of One Gateway Center, Pittsburgh, Pa. as Hi-sil 600.

Suspension Agent

Preferably, a suspension agent is used to ensure that the powdered metal does not settle out of the coating composition and form a hard cake. A suitable suspension agent is polyethylene which can be purchased as MPA-60X from Baker Caster Oil Co. of PO Box 700, Hightstown, N.J. and as MRT-1 from Matteson-Rudolfi, Inc. of Detroit, Mich. MPA-60X is essentially one part polyethylene in three parts xylene by weight. MRT-1 is also believed to be essentially one part polyethylene in three parts xylene by weight. The amount of polyethylene used as a suspension agent may be about 0.2–5% by weight of the metal powder and preferably about 0.4–6% by weight of the metal powder. This is equivalent to about 0.8–20% and 1.6–10.4% by weight, respectively, of the MPA-60X.

Hygroscopic Agent

Preferably, to ensure that the titanate primary bonding material does not undergo a hydrolysis reaction before the coating is applied to a substrate, the coating contains a water scavenger or hygroscopic agent. Inclusion of a hygroscopic agent is particularly desirable when a synthetic manganese dioxide pigment is used since it contains 2–3% water which over a period of time could at least partially hydrolize the titanate bonding material. Suitable hygroscopic agents are calcium oxide, silica dioxide, barium oxide, and potassium chloride. A suitable silica dioxide is commercially available from Davidson Chemical Co. of Baltimore, Md. as Syloid AL-1 and Syloid ZN-1. The amount of hygroscopic agent in the coating composition may be 0.2% to 12% by weight of the powdered metal and preferably, about 0.4% to 6% by weight of the powdered metal. An excess amount of hygroscopic agent is believed to decrease the corrosion resistance of the coating.

Vehicle

The vehicle or carrier of the coating composition contains both active and inactive solvents. The active solvents disolve the titanate primary bonding polymers and the inactive solvents decrease the cost of the vehicle, are excellent thinners of the coating composition, and are believed to modestly improve adhesion and salt spray resistance by modifying and controlling film flow. The vehicle solvents may consist of about 10% to 60%, desirably 20% to 50%, and preferably 30% to 40% by weight of inactive solvents and the balance preferably of active solvents.

Suitable active solvents for the titanate polymers are butyl alcohol N-butanol (hereinafter N-butanol), 2-ethylhexanol, cellosolve acetate, heptane, methyl ethyl ketone and methyl isobutyl ketone.

Suitable inactive solvents include aromatic hydrocarbons such as xylol, xylene, and toluene. Suitable hydrocarbon solvents are commercially available from Chemcentral of 13395 Huron River Drive, Detroit, Mich. as SC 100 and SC 150 and Neville Chemicals Co. of Neville Island, Pittsburgh, Pa. as Nebony L-55 and Nebony L-100. The SC 100 solvent has a boiling range of 311° F. to 344° F. and a flash point of 107° F. The SC 150 solvent has a boiling range of 370° F. to 410° F. and a flash point of 151° F. The Nebony solvents have a flash point of 230° F., a molecular weight of about 300 to 475, and are believed to have excellent resistance to alkalies, dilute acids and moisture.

The coating composition contains sufficient vehicle solvents (active plus inactive solvents) to produce the viscosity desired for the particular method of applying the liquid coating to a substrate. For application of the coating to a substrate by dipping, rolling or spraying, the viscosity of the composition in a Zahn No. 2 cup is usually in the range of 20–150 seconds, desirably 20–100 seconds and preferably 30–60 seconds. A coating composition viscosity in this range can usually be obtained when the vehicle solvents by weight are about 0.9 to 1.5 times the weight of all the resins in the composition.

Making The Composition

Preferably, although not necessarily, the coating composition is made by separately mixing and milling two groups of constituents and then blending the two groups together. In one group the manganese dioxide pigment, titanate bonding material and an active solvent are mixed together preferably in a high speed Cowles dissolver. Preferably when mixed the manganese dioxide is finely divided with an average particle size in the range of about 5 to 40 microns and preferably 20 to 30 microns. Usually the amount of active solvent is about 10-20% and preferably 15% by weight of the titanate material. These constituents are mixed until the maganese dioxide is completely wetted by the titanate material and the mixture is uniform. Usually this mixing is done with a Cowles impeller speed of 1500–4500 RPM and preferably 2000–3000 RPM for a period of about 30 to 45 minutes.

If a synthetic manganese dioxide is used an exothermic reaction takes place during mixing with the titanate bonding material which will heat the mixture to a deleterious temperature of more than 140° F. unless the mixture is cooled. When a synthetic manganese dioxide is mixed, the maximum temperature of the mixture is usually maintained at less than 130° F. and preferably about 120°–110° F. by a cooling jacket. The resulting mixture of these constituents is milled in a sand mill adjusted and operated to produce a homogeneous mixture having a Hegman particle size grind rating of 4–7H and preferably about 5–6 H.

In another and separate group the remaining constituents of the coating are milled in a sand mill adjusted and operated to produce a homogeneous mixture having a Hegman partice size grind rating of 4–7H and preferably about 5–6H. Typically these remaining constituents are the secondary resin, finely divided metal, suspension agent, hygroscopic agent, thixotropic agent, and the balance of the vehicle solvents.

These two groups of constituents are then blended to produce the coating composition. The two groups are blended to produce a homogeneous coating composition, preferably in a Cowles high speed dissolver usually operated with an impeller speed of 2000–4500 RPM and desirably about 3000 RPM for a period of about 10 to 15 minutes.

Using The Composition

In use a thin wet film of the coating composition is applied to a metal substrate and then cured to a dry corrosion resistant protective coating. If needed to facilitate the particular method of application, the viscosity of the coating composition can be reduced by adding a relatively small amount of compatible solvents which preferably are a mixture of the active and inactive solvents of the vehicle of the coating composition.

After a thin wet film of the composition with a thickness of about 1 to 3 mils is applied to the substrate, the wet film is heated to a relatively low elevated temperature for a sufficient period of time to evaporate the vehicle, thereby drying the film and initiating a hydrolysis reaction bonding the coating to the substrate. Sufficient moisture to complete the hydrolysis reaction, and hence bonding, is absorbed from the atmosphere and/or from any water quench used to cool the heated coated substrate. The thickness of the dried and cured coating is not more than about 1.5 mils and usually in the range of about 0.3 to 0.8 of a mil. The wet film can be dried by heating it to an elevated temperature for a period of time of about 15 seconds to 90 minutes, desirably about 30 seconds to 50 minutes and preferably 30 seconds to 15 minutes so that the maximum temperature of the substrate is in the range of 200°–500° F., desirably 250°–450° F. and preferably about 300°14 400° F.

In practice, the dried and cured coating tenaciously adheres to the metal substrate, provides a black color and prevents corrosion. This is believed to be the only black-colored coating which provides such excellent protection of the substrate from corrosion without requiring the coating to be covered with oil to protect the finely divided metal from oxidation, thereby greatly increasing salt spray corrosion resistance.

EXAMPLES

The following examples of compositions are illustrative of this invention and are not intended to limit the scope of the invention as defined by the appended claims.

EXAMPLE 1

The following materials were added in the order listed to a vessel under agitation using a high speed Cowles Dissolver.

| Mixture A | |
|---|---|
| Materials | Parts By Weight |
| 2-Ethyl-hexyl titanate | 325 |
| Manganese Dioxide (20-30 microns) | 200 |

-continued

| Mixture A | |
|---|---|
| Materials | Parts By Weight |
| N—Butanol | 50 |

These materials were mixed at a speed of about 2000 RPM until the mixture was completely uniform and the manganese dioxide was completely wetted by the 2-ethylhexyl titanate. A cooling jacket was used since an exothermic reaction occurs between the titanate and synthetic manganese dioxide. The maximum temperature was maintained by the cooling jacket at about 115° F. with a maximum of 130° F. This mixture A was then milled in a sand mill to produce a homogeneous mixture having a Hegman particle size grind rating of 5H.

A second separate mixture, having the following composition, was then run through a sand mill.

| Mixture B | |
|---|---|
| Materials | Parts By Weight |
| Ethyl-hydroxy-ethyl cellulose (10% by weight in N—Butanol) | 100 |
| Suspension Agent (25% by weight MPA-60X in Aromatic hydrocarbon solvent SC 150) | 27 |
| Hygroscopic Agent (Syloid ZN-1) | 75 |
| Powdered Zinc (Purity L-15) | 400 |
| Aromatic Hydrocarbon Solvent (SC 150) | 25 |
| Thixotropic Agent (Hi-Sil 600) | 13 |

This mixture B was milled in a sand mill to a Hegman particle size grind rating of 5H and then pumped out of the mill and into a vessel containing the mixture A. These mixtures A and B were then blended in a Cowles High Speed Dissolver until they became a homogenous coating composition.

A wet film of this coating composition was applied by spraying on iron as well as phosphated steel bolts, stampings and springs, and then heated for 15 minutes at 400°–450° F. to provide a thin dry coating with a thickness of 0.6–1.5 mil. The resulting cured coating tenaciously adhered to its substrate and provided excellent corrosion protection including salt spray protection of more than 400 hours under ASTM test procedure 117.

EXAMPLE 2

The following materials were added in the order listed to vessel and mixed together under agitation using a high speed Cowles Dissolver.

| Material | Parts By Weight |
|---|---|
| 2-ethyl-hexyl titanate | 325 |
| N—Butanol | 50 |
| Aromatic Hydrocarbon Solvent (Nebony L-100 and Sc-150) | 19 |
| Suspension Agent (MPA 2000X in xylene) | 27 |
| Hygroscopic Agent (Tullanox-500) | 4.5 |
| Thixotropic Agent (Syloid ZN-1) | 13 |
| Powdered Zinc (Federated Metals L-10) | 450 |
| Manganese Dioxide (B-Natural Ore, 5–40 micron) | 150 |
| Aromatic Hydrocarbon Solvent (SC 150) | 35 |

Because this manganese dioxide composition is derived from the natural ore, no exothermic reaction occurs. Therefore, a water jacket mixer tank was not required because the temperature of the mixture did not exceed 140° F. This mixture was pumped into a sand mill and milled to a homogenous coating composition having a Hegman particle size grind rating of about 6H.

A wet film of this coating composition was applied by spraying to steel bolts and sheet metal stampings and dried at a temperature of about 350° F. for twenty minutes to a thickness of 0.6–1.2 mil. The resulting cured coating tenaciously adhered to its substrate and provided excellent corrosion protection including salt spray protection of more than 600 hours under ASTM test procedure B-117.

EXAMPLE 3

The following materials were added in the order listed to a vessel and mixed together under agitation using a high speed Cowles Dissolver.

| Mixture A | |
|---|---|
| Materials | Parts By Weight |
| Tetra-butyl-titanate (monomer) | 200 |
| Manganese Dioxide M (synthetic) | 250 |
| N—Butanol | 50 |

A cooling jacket was provided to dissipate the heat from the exothermic reaction which occurs between tetra-butyl-titanate and the synthetic manganese dioxide. These materials were mixed at a speed of about 3000 RPM and maintained at a maximum temperature of 110°–120° F. with the water jacket while the exothermic reaction took place. Afterward, the mixture was milled in a sand mill to produce a homogeneous mixture having a Hegman particle size grind rating of 6H. Thereafter, this mixture A was pumped into a holding tank.

A mixture having the following composition was then run through a sand mill.

| Mixture B | |
|---|---|
| Material | Parts By Weight |
| Ethyl-hydroxy-ethyl-cellulose (10% solution in N—Butanol) | 100 |
| Calcium oxide | 25 |
| Suspension Agent (MPA-60X) | 20 |
| Hygroscopic Agent (Syloid ZN-1) | 5 |
| Thixotropic Agent (Hi-Sil T-600) | 13 |
| Powdered Zinc (Purity 515) | 350 |

This mixture was milled to produce a homogeneous mixture having a Hegman particle size grind rating of 5H, and then pumped into the holding tank containing the mixture A. The mixtures A and B were then blended in a Cowles high speed dissolver to produce a homogenous coating composition of uniform color and consistency.

A wet film of this coating composition was applied by spraying to steel coils and leaf springs, and then dried at a temperature of 325°–350° F. for ten minutes to a thickness of about 0.7 to 1.2 mil.

The resulting cured coating tenaciously adhered to the substrate and provided excellent corrosion protection including salt spray protection of more than 250 hours under ASTM test procedure B-117.

EXAMPLE 4

To demonstrate the effect of varying the ratio of manganese dioxide to powdered metal four separate batches of coating compositions were made in which the only difference was this ratio. For each batch the following materials were added in the order listed to a vessel and mixed under agitation using a high speed Cowles Dissolver. For each batch the materials were mixed at a speed of about 3000 RPM for about 30 minutes until the mixture was uniform. For each batch this mixture was then pumped into a sand mill and milled to a homogeneous coating composition having a Hegman particle size grind rating of about 6H.

| Materials | Parts By Weight |
| --- | --- |
| Tetra-butyl titanate | 200 |
| N—Butanol | 90 |
| Aromatic Hydrocarbon Solvent (SC 150) | 8 |
| Ethyl-hydroxyl-ethyl cellulose | 10 |
| Suspension Agent (MPA 60-X) | 19 |
| Hygroscopic Agent (Syloid ZN-1) | 7.5 |
| Thixotropic Agent (Hi-sil 600) | 13 |
| Powdered Zinc (Purity 515) | |
| Manganese Dioxide | |

The amount of powdered zinc and synthetic manganese dioxide for each batch 4A through 4D was as follows:

| | Parts by Weight | | | |
| --- | --- | --- | --- | --- |
| | 4A | 4B | 4C | 4D |
| Powdered Zinc | 450 | 400 | 350 | 300 |
| Manganese Dioxide M | 150 | 200 | 250 | 300 |
| Salt Spray Corrosion Resistance in hours | 800 | 600 | 400 | 200 |

As indicated above the salt spray corrosion resistance of plain carbon steel plates having a cured coating thereon from the batches 4A through 4D and tested under ASTM test procedure B-117 decreased as the ratio of manganese dioxide to powdered zinc increased. Increasing this ratio made the color of the coating a darker and flatter shade of black. A wet film of each batch of coating was applied to the steel plates by spraying and then heated for about 15 minutes at 350°–400° F. to provide a thin dry and cured coating with a thickness of 0.8–1.2 mil. The cured coating tenaciously adhered to its substrate.

To demonstrate the difference between using natural and synthetic manganese dioxide as a pigment four additional batches of coating compositions 4E through 4H were made which were identical in composition, processing, application, curing, and testing to batches 4A through 4D respectively except that they contained natural, not synthetic, manganese dioxide. When applied to and cured on plain carbon steel plates and subjected to salt spray ASTM test procedure B-117 the coatings of these batches had the following corrosion resitance in hours:

| 4E | 4F | 4G | 4H |
| --- | --- | --- | --- |
| 1000 | 800 | 600 | 400 |

These batches show that the same weight of natural manganese dioxide pigment produces a coating having somewhat greater salt spray corrosion resistance than the same coating with synthetic manganese dioxide. However, these coatings with natural manganese dioxide are not quite as dark a shade of black as their corresponding coatings with the same weight of synthetic manganese dioxide.

I claim:

1. A black colored corrosion resistant coating composition for application to and curing on a metal substrate when raised to an elevated temperature, comprising: finely divided metal of the group consisting essentially of zinc, magnesium, aluminum, stainless steel, and alloys and blends thereof; said finely divided metal having an average particle size not greater than about 100 microns; a quantity of manganese dioxide equal to about 30% to 100% by weight of said finely divided metal; a quantity of a primary bonding material of a titanate polymer equal to about 9% to 47% by weight of said finely divided metal; and a vehicle of active and inactive organic solvents compatable with said titanate polymer and of sufficient quantity for the coating composition to have a viscosity in a Zahn No. 2 cup of about 20 to 150 seconds.

2. The coating composition of claim 1 which also comprises a quantity of a secondary resin equal to about 0.7% to 23% by weight of said finely divided metal, said secondary resin comprising at least one of cellulose, polyester, medium WPE resins, silicones, epoxy in the presence of caprolactam pyrrolidone and piperidone, conjugated drying oils, unsaturated carboxylic amides and aromatic asphalt resins.

3. The coating composition of claim 1 which also comprises a quantity of a secondary resin equal to about 0.7% to 23% by weight of said finely divided metal, said secondary resin consisting essentially of cellulose, polyester, medium WPE resins, silicones, epoxy in the presence of caprolactam pyrrolidone and piperidone, conjugated drying oils, unsaturated carboxylic amides and aromatic asphalt resins.

4. The coating composition of claim 1 wherein said titanate polymer comprises at least one of the alkyl esters of tetraisopropl titanate, tetrabutyl titanate, 2-ethylhexyl titanate and N-butyl titanate.

5. The coating composition of claim 3 wherein said titanate polymer consists essentially of the alkyl esters of tetraisopropl titanate, tetrabutyl titanate, 2-ethylhexyl titanate and N-butyl titanate polymers.

6. The coating composition of claim 5 which also comprises a quantity of thixotropic agent equal to about 0.4% to 12% by weight of said finely divided metal.

7. The coating composition of claim 6 which also comprises a quantity of a suspension agent equal to about 0.2% to 5% by weight of said finely divided metal.

8. The coating composition of claim 6 which also comprises a quantity of a hygroscopic agent equal to about 0.2% to 12% by weight of said finely divided metal.

9. The coating composition of claim 1 which also comprises a quantity of thixotropic agent equal to about 0.4% to 12% by weight of said finely divided metal.

10. The coating composition of claim 1 which also comprises a quantity of a suspension agent equal to about 0.2% to 5% by weight of said finely divided metal.

11. The coating composition of claim 1 which also comprises a quantity of a hygroscopic agent equal to about 0.2% to 12% by weight of said finely divided metal.

12. The coating composition of claim 1 wherein said active solvents comprise butyl alcohol N-butanol, 2-ethylhexanol, cellosolve acetate, heptane, methyl ethyl ketone and methyl isobutyl ketone.

13. The coating composition of claim 12 wherein said inactive solvents comprise aromatic hydrocarbon solvents and are about 10% to 60% by weight of all of said solvents.

14. A method of coloring a metal substrate black and protecting the substrate from corrosion, comprising: applying to at least a portion of a surface of the substrate a thin and wet film of a liquid composition comprising finely divided metal of the group consisting essentially of zinc, magnesium, aluminum, stainless steel, and alloys and blends thereof; said finely divided metal having an average particle size not greater than about 100 microns; a quantity of manganese dioxide equal to about 30% to 100% by weight of said finely divided metal; a quantity of a primary bonding material of a titanate polymer equal to about 9% to 47% by weight of said finely divided metal; said titanate polymer comprises at least one of the alkyl esters of tetraisopropyl titanate, tetrabutyl titanate, 2-ethylhexyl titanate and N-butyl titanate; a quantity of a secondary resin equal to about 0.7% to 23% by weight of said finely divided metal, said secondary resin comprising at least one of cellulose, polyester, medium WPE resins, silicones, epoxy in the presence of caprlactom pyrrolidone and piperidone, conjugated drying oils, unsaturated carboxylic amides and aromatic asphalt resins; and a vehicle of active and inactive solvents compatable with said titanate polymer and of sufficient quantity for the coating composition to have a viscosity in a Zahn No. 2 cup of about 20 to 150 seconds; and heating the thin wet film to an elevated temperature for a sufficient period of time to evaporate the solvents and at least initiate curing of said primary bonding material to tenaciously adhere the dry film to the substrate as a coating coloring and protecting the substrate without heating any portion of the substrate to a temperature greater than 450° F.

15. The method of claim 14 wherein the thickness of the wet film of the composition applied th the substrate is not greater than about 3 mils and the thickness of the dried and cured film of the substrate is not greater than about 1.5 mils.

16. A method of making a black colored corrosion resistant liquid composition comprising: mixing together finely divided metal of the group consisting essentially of zinc, magnesium, aluminum, stainless steel, and alloys and blends thereof; said finely divided metal having an average particle size not greater than about 100 microns; a quantity of manganese dioxide equal to about 30% to 100% by weight of said finely divided metal; a quantity of a primary bonding material of a titanate polymer equal to about 9% to 47% by weight of said finely divided metal; said titanate polymer comprises at least one of the alkyl esters of tetraisopropyl titanate, tetrabutyl titanate, 2-ethylhexyl titanate and N-butyl titanate; a quantity of a secondary resin equal to about 0.7% to 23% by weight of said finely divided metal, said secondary resin comprising at least one of cellulose, polyester, medium WPE resins, silicones, epoxy in the presence of caprolactam pyrrolidone and piperidone, conjugated drying oils, unsaturated carboxylic amides and aromatic asphalt resins; and a vehicle of active and inactive solvents compatable with said titanate polymer and said secondary resin and of sufficient quantity for the coating composition to have a viscosity in a Zahn No. 2 cup of about 20 to 150 seconds; while mixing maintaining the temperature of said mixture at less than about 140° F.; and after mixing milling said mixture to produce a homogeneous composition having a Hegman grind rating in the range of about 4 to 7.

17. The method of claim 16 wherein said manganese dioxide is a synthetic manganese dioxide.

18. The method of claim 16 which also comprises milling together as one batch separate from said secondary resin and finely divided metal said primary bonding material, manganese dioxide and at least part of said active solvents to a Hegman grind rating of about 4H to 7H; milling together as another batch seperate from said one batch said secondary resin and at least part of said inactive solvents to a Hegman grind rating of about 4H to 7H; and thereafter blending both of said batches together to produce said homogeneous liquid composition.

19. The method of claim 18 wherein said manganese dioxide is a synthetic manganese dioxide.

20. The method of claim 19 which also comprises mixing in said another batch of a quantity of a hygroscopic agent equal to about 0.2% to 12% by weight of said finely divided metal.

* * * * *